US008886829B1

(12) United States Patent
Poursohi et al.

(10) Patent No.: US 8,886,829 B1
(45) Date of Patent: Nov. 11, 2014

(54) METHODS AND SYSTEMS FOR ROBOT CLOUD COMPUTING USING SLUG TRAILS

(71) Applicant: Google Inc., Mountain View, CA (US)

(72) Inventors: Arshan Poursohi, Berkeley, CA (US); Ryan Hickman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/897,934

(22) Filed: May 20, 2013

Related U.S. Application Data

(63) Continuation of application No. 13/463,469, filed on May 3, 2012, now Pat. No. 8,478,901.

(60) Provisional application No. 61/483,291, filed on May 6, 2011, provisional application No. 61/596,425, filed on Feb. 8, 2012.

(51) Int. Cl.
*G06F 15/173* (2006.01)
*H04L 29/08* (2006.01)

(52) U.S. Cl.
CPC .............. *H04L 67/10* (2013.01); *Y10S 901/01* (2013.01)
USPC ................................ 709/238; 700/248; 901/1

(58) Field of Classification Search
USPC ................................ 709/238; 700/248; 901/1
See application file for complete search history.

(56) References Cited

U.S. PATENT DOCUMENTS

| 7,523,185 | B1 * | 4/2009 | Ng et al. ........................ 709/223 |
| 2002/0026531 | A1 * | 2/2002 | Keane et al. ................... 709/250 |
| 2005/0171636 | A1 * | 8/2005 | Tani ............................... 700/245 |
| 2010/0241260 | A1 * | 9/2010 | Kilibarda et al. ............... 700/95 |
| 2010/0333116 | A1 * | 12/2010 | Prahlad et al. ................. 719/328 |
| 2011/0288684 | A1 * | 11/2011 | Farlow et al. .................. 700/264 |
| 2012/0110651 | A1 * | 5/2012 | Van Biljon et al. ............... 726/4 |
| 2012/0165978 | A1 * | 6/2012 | Li et al. ......................... 700/248 |
| 2012/0197439 | A1 * | 8/2012 | Wang et al. .................... 700/259 |

* cited by examiner

*Primary Examiner* — Thomas Dailey
(74) *Attorney, Agent, or Firm* — McDonnell Boehnen Hulbert & Berghoff LLP

(57) ABSTRACT

A method includes receiving a first request for a first robot to perform a first task and processing the first request through first and second computing resources to identify instructions for the first robot to perform the first task. The method also includes providing the one or more instructions to the first robot and identifying information associated with the second computing resource, wherein such information includes environmental information related to a location where the first task is to be performed. The method further includes associating the identified information with the first computing resource, receiving a second request for a second robot to perform a second task, processing the second request through the first computing resource, accessing the information associated with the first computing resource, and, based upon the accessed information, providing instructions to the second robot to perform the second task.

17 Claims, 3 Drawing Sheets

METHODS AND SYSTEMS FOR ROBOT CLOUD COMPUTING USING SLUG TRAILS

CROSS-REFERENCE TO RELATED APPLICATIONS

This patent application is a continuation of U.S. patent application Ser. No. 13/463,469 filed on May 3, 2012, which claims priority to U.S. Provisional Application Nos. 61/483,291 filed on May 6, 2011 and 61/596,425 filed on Feb. 8, 2012, the entire contents of each of which are incorporated herein by reference, as if fully set forth in this application.

BACKGROUND

Cloud computing refers generally to the provision of computing resources via a computer network. Common shorthand used for a cloud computing service or an aggregation of existing cloud services is "the cloud." In a traditional model of computing, data and software are entirely contained in a user's device, which may be a personal computer (PC), for example. In cloud computing, however, the user's device is configured to connect to computing resources via a computer network and, consequently, may contain relatively little hardware, software, or data. For example, the user's device may include an operating system, a network connection, and a network interface application, such as a web browser, to provide access to the network of computing resources, which may include, for example, servers, processors, hard drives, memory, applications, etc., on the cloud. Thus, the user's device may simply serve as an input device and/or display terminal for processes occurring on the cloud.

Cloud computing may also free the user and the user's device from certain hardware and software installation and maintenance tasks due to applications being performed on computing resources residing in the cloud. Further, devices connected to the cloud may be connected to the same pool of data and applications. This allows users to store and access personal files such as music, pictures, videos, and bookmarks or play games or use productivity applications remotely rather than physically carrying around a storage medium, such as a DVD or thumb drive, to access such data and/or applications.

In one example, a user's device may connect to a host of web servers that run user interface software that collects and interprets commands from the user. In response to the commands, the servers may manage some or all of the necessary computing and can store or retrieve information from database or file servers and cause the user's device to display relevant information. Through cloud computing, data across multiple servers distributed throughout various locations can be synchronized and allow for collaborative work on a project or task from any number of user devices connected to the cloud from any location.

SUMMARY

In one example, a method includes receiving a first request for a first robot to perform a first task and processing the first request through a first computing resource and a subsequent second computing resource to identify one or more instructions for the first robot to perform the first task. The first and second computing resources may be configured to communicate with a cloud computing system. The method also includes providing the one or more instructions to the first robot and identifying information associated with the second computing resource, wherein the information may include environmental information related to a location where the first task is to be performed. Further, the method includes associating the identified information with the first computing resource and receiving a second request for a second robot to perform a second task at the location where the first task is to be performed. In the present disclosure, the first and second tasks can be performed at the same location, at a similar general location, or at different locations with some overlap between the different locations. In addition, the method includes processing the second request through the first computing resource, accessing the environmental information associated with the first computing resource, and, based upon the accessed information, providing one or more instructions to the second robot to perform the second task.

In another example, a method includes receiving a request for a robot to perform a task and processing the request along a processing route through a plurality of nodes of a cloud computing system to identify environmental information related to a location where the task is to be performed. The identified information is associated with one or more first nodes of the plurality of nodes. The method also includes associating the identified information with one or more second nodes of the plurality of nodes. The one or more second nodes are upstream from the one or more first nodes along the processing route.

In yet another example, a system for controlling a client device includes a server device that is configured to receive a request for a client device to perform a task. The server device is configured to communicate with a cloud computing system. The system also includes first and second computing resource nodes configured to be coupled to the cloud computing system. The cloud computing system is configured to route the request through the first and second computing resource nodes to provide first and second instructions, respectively, for the client device to perform the task. The cloud computing system is also configured to identify information that is associated with the second computing resource node, wherein the information includes data from one or more sensors coupled to the client device. Further, the cloud computing system is configured to associate the identified information with the first computing resource node.

In a further example, a method includes receiving a first request for a first robot to perform a first task at a location, providing first instructions to the first robot for performing the first task at the location, and receiving data associated with the location collected by the first robot while performing the first task at the location. The method also includes creating a slug trail associated with the first request. The slug trail is associated with at least some of the data collected by the first robot and the slug trail is active for a predetermined time frame. Further, the method includes receiving a second request for a second robot to perform a second task at the location, determining whether the slug trail is active, and, in response to determining that the slug trail is active, sending second instructions to the second robot for performing the second task at the location. The second instructions are based at least in part on the data associated with the slug trail.

The foregoing summary is illustrative only and is not intended to be in any way limiting to scope of the present disclosure. In addition to the illustrative aspects, embodiments, examples, and features described above, further aspects, embodiments, examples, and features will become apparent by reference to the accompanying figures and the following detailed description.

DETAILED DESCRIPTION

Figure 1:
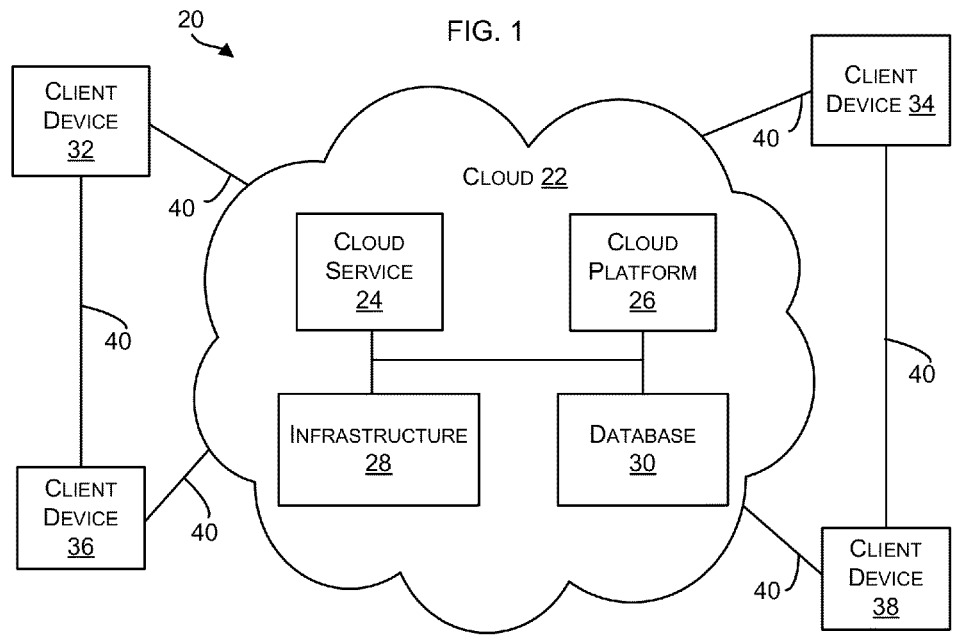
FIG. 1 is a block diagram of a cloud computing system in accordance with one example.

The present disclosure is related generally to cloud computing over a computer network in which computing resources, application execution, data storage, etc., may be divided, to some extent, between client and server devices.

Generally, a client device is a device that requests access to a resource or service on the cloud and a server device is a device that is coupled to the cloud and provides the resource or service for the client device. In some instances, a device connected to the cloud can function as both a client device and a server device. In one example, the client device is configured as a robot that broadly includes a device that can be controlled to perform a task. The robot may be configured to interact with its surrounding environment utilizing a mechanical, electrical, and/or electromechanical actuation capability. Alternatively or in conjunction, the robot may include various sensors for detecting characteristics of an environment. In one example, sensors are configured as modules that can be added or removed from the robot, as needed or desired. In some examples, a robot may be configured to receive a second device, such as mobile phone or laptop, which may be configured to function as a controller of the robot and to provide additional sensor or other device modules.

In some examples, a robot may interact with the cloud to perform actions or commands, such as to interact with the robot's environment and/or to share information with other devices connected to the cloud. Within various examples, a robot may interact with the cloud to facilitate object recognition and retrieval, to perform an object mapping or inventorying function, to perform voice recognition or command interpretation, to perform navigational functions, etc.

Still further, in the present disclosure, a plurality of robots can be connected to local and/or remote computing resources on the cloud to share data, instructions, modules, processing capabilities, and the like. The computing resources accessible through the cloud can be shared between one or more client devices or robots on a near real-time basis. Parts of the shared data and program logic may be dynamically delivered, as needed or otherwise, to various client devices connected to the cloud. Specific details of the cloud architecture may be transparent to users of client devices. Thus, a PC user or robot client device that accesses an application through the cloud may not be aware that the PC or robot is downloading program logic and/or data from the cloud or that the PC or robot is offloading processing or storage functions to the cloud, for example.

Generally, interactions between server and client devices follow slug trails or data processing routes that can be utilized to facilitate further interactions between the server and client devices. For example, shared information can be associated with or cached along a slug trail and such shared information can be utilized to facilitate subsequent data processing for interactions that follow a similar slug trail. The shared information can include information that may be used to perform a task or function, for example, object recognition or object interaction, and/or information relating to an environment where a task it to be performed, for example, a map of an area including identified objects within the area. A slug trail may be indicative of previous requests to perform a task and matching responses or processing routes for the request. In general, requests to perform similar tasks also share similarities in slug trails or processing routes of the request.

In a multi-node system, where a request for a robot to perform a task is routed through various nodes of a cloud system, the request/response can be cached so that future requests hit an answer sooner along the processing path or slug trail. Such nodes may include different computing resources, different components within a single computing resource, and/or different processing steps executed to perform the task. In the present example, information relevant to the task can be associated with nodes through which the request or command is routed. For example, information that otherwise would be associated with downstream or high-level nodes can be stored or otherwise made accessible to upstream or low-level nodes, such that the relevant information is encountered sooner in the path through which the command is routed. Such information can be taken into account during the processing of the command and the execution of the task. Further, information that is relevant to a task can be collected and shared by a plurality of robots to improve the processing and execution of tasks.

For example, if a robot is navigating through an area and notices that a hallway is blocked by a new obstacle, the robot can publish an update on the command processing pathway or slug trail so that other robots are aware of the obstacle and other problems or constraints and may request an alternate pathway. Such update can be published or otherwise cached along the command processing pathway at one or more upstream nodes so that such information can be taken into account to proactively plan a route for another robot around the obstacle. Other illustrative examples of slug trails are described in more detail herein. Any interaction that the robot experiences can be published to the cloud and shared among many different robots. Specific locations may also trigger robots to download new information. For example, when entering a new room, data about the room may be downloaded that was collected by another robot.

Referring now to the figures, FIG. 1 illustrates a cloud-based computing system 20 according to one example. In FIG. 1, the system 20 includes a cloud 22. The cloud 22 further includes a cloud service 24, a cloud platform 26, a cloud infrastructure 28, and a database 30. In other examples, the cloud 22 may include additional of fewer functional and/or physical components. In addition, the cloud service 24, the cloud platform 26, the cloud infrastructure 28, and the database 30 may include other elements or components that are not specifically illustrated in FIG. 1. Generally, one or more functional or physical components of the system 20 may be divided into additional functional or physical components or combined into fewer functional or physical components. Delivery of cloud computing resources may involve multiple clouds 22 or cloud components that communicate with each other over application programming interfaces, such as web services or multi-tier architectures, for example.

Generally, the cloud 22 represents a networked architecture of computing resources and, in one example, the cloud service 24 represents a queue for handling requests from client devices connected to the cloud. The cloud platform 26 may include a frontend of the cloud 22 and may be coupled to the cloud service 24 to perform functions to interact with client devices. The cloud platform 26 may provide applications used to access the cloud 22 via a user interface, such as a web browser. The cloud infrastructure 28 may include service applications for billing components of the cloud 22 and, thus, may interact with the cloud service 24. The database 30 may represent storage capabilities of the cloud 22 and may be accessed by any of the cloud service 24, the cloud platform 26, the infrastructure 28, and client devices.

The system 22 of FIG. 1 includes a number of client devices 32-38 that can be configured to communicate with the cloud 22 and to each other by wired and/or wireless communication connections 40. Of course, additional or fewer client devices may communicate with the cloud 22. In some examples, the devices 32-38 are configured to collect and upload data to the cloud 22. The cloud 22 may be configured to perform calculations or analysis on the data and return processed data to the device 32-38. In another example, the collected data can be uploaded to another local or remote device connected to the cloud 22 for processing and analysis.

By way of non-limiting examples, the devices 32-38 may include any type of general computing device, such as a PC, laptop computer, tablet computer, etc. and/or any type of general mobile computing device, such as a personal digital assistant, global positioning system device, cellular telephone, smart phone, portable gaming device, etc. In addition, the devices 32-38 may include robot devices that generally may comprise a computing device that has connection capabilities to the cloud 22 and that has an actuation capability, such as mechanical, electrical, and/or electromechanical capabilities. Generally, the devices 32-38 may include one or more of a display system, memory, input/output components, a network connection, and a processor.

Further, any of the client devices 32-38 may include one or more sensors, such as a gyroscope or an accelerometer to measure movement of the device, global positioning system (GPS) receivers, optical sensors, infrared sensors, sonar, biosensors, radio frequency identification systems, near field communication chips, wireless network sensors, compasses, among others.

In addition, any of the client devices 32-38 may include an integrated user-interface that allows a user to interact with the device. For example, the devices 32-38 may include various buttons and/or a touchscreen interface that allow a user to provide input to the device. In another example, the client device 32-38 may include a microphone configured to receive voice commands from a user. Furthermore, the devices 32-38 may include one or more interfaces that allow various types of secondary devices to be connected thereto, as will be described in more detail hereinafter.

In FIG. 1, the communication connections 40 between client devices 32-38 and the cloud 22 may include wired connections, such as a serial or parallel bus. The communication connections 40 may also be wireless links that utilize, for example, Bluetooth, IEEE 802.11, which may refer to IEEE 802.11-2007, IEEE 802.11n-2009, or any other IEEE 802.11 revision, and the like.

In other examples, the system 20 may include access points through which the client devices 32-38 may communicate with the cloud 22. Access points may take various forms, for example, an access point may take the form of a wireless access point (WAP) or wireless router. As another example, if a client device 32-38 connects using a cellular air-interface protocol, such as a CDMA or GSM protocol, an access point may be a base station in a cellular network that provides Internet connectivity via the cellular network.

As such, the client devices 32-38 may include a wired or wireless network interface through which the client devices can connect to the cloud 22 (or access points). As an example, the client devices may be configured to use one or more protocols such as 802.11, 802.16 (WiMAX), LTE, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

Figure 2:
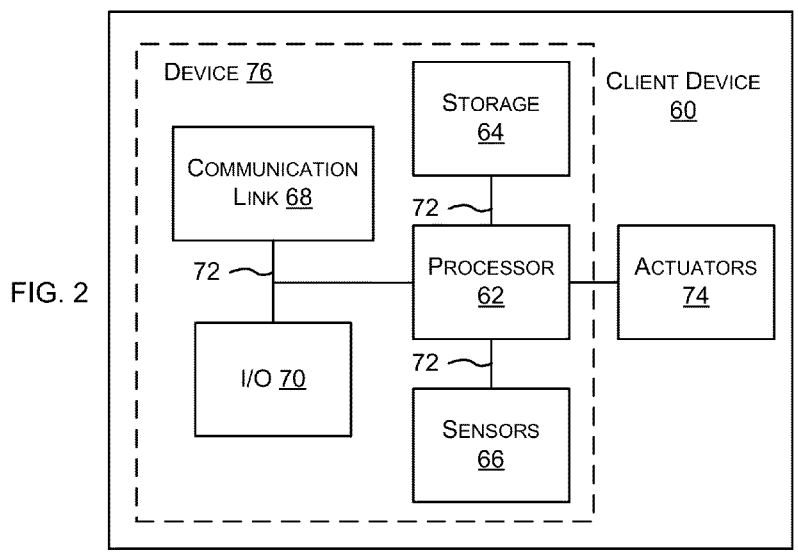
FIG. 2 is a block diagram of a client device in accordance with one example.

FIG. 2 illustrates an example client device 60 that includes computer hardware, such as a processor 62, memory or storage 64, one or more sensors 66, a communication interface or connection 68 to the cloud, and one or more input/output (I/O) components 70. In FIG. 2, the processor 62, memory or storage 64, sensor(s) 66, communication interface 68, and I/O component(s) 70 are operably coupled together by one or more wired or wireless connections 72. In other examples, the device 60 may include additional or fewer components without departing from the spirit of the present disclosure.

Generally, the processor 62 may be configured to operate the device 60 in accordance with an operating system, program instructions, and other data stored in the storage 64. In one example, one or more of the operating system, program instructions, and other data, or portions thereof, can be stored on or otherwise accessible via the communication interface 68 from a cloud, such as the cloud 22 of FIG. 1. The communication interface 68 can be a wired and/or wireless communication interface to access the cloud 22. A wired interface may include, for example, a parallel bus or a serial bus, such as a Universal Serial Bus (USB). A wireless interface may utilize, for example, Bluetooth, IEEE 802.11, cellular (such as GSM, CDMA, UMTS, EV-DO, WiMAX, or LTE), or Zigbee, among other possibilities.

The storage 64 may also be configured to compile data from the one or more sensors 66 of the device 60 and the processor 62 may be configured to interpret the data from the sensor(s). Non-limiting example sensors 66 may include smoke sensors, light sensors, proximity sensors, radio sensors, infrared sensors, microphones, gyroscopes, accelerometers, cameras, radar, capacitive sensors, touch sensors, etc.

Further, the processor 62 may be configured to processes inputs from the I/O device(s) 70 and to control outputs to the I/O device(s). The I/O devices 70 may include, for example, a touch panel, keypad, mouse, microphone, speaker, display panel, and the like.

In one example, the client device 60 may be a robot that is controlled according to an operating system designed for specific functions of the robot. The robot operating system may provide libraries and tools, such as hardware abstraction, device drivers, visualizers, message-passing, package management, program instructions, etc., to enable robot executable applications. Examples of robot operating systems include open source or proprietary software such as ROS (robot operating system), DROS (Dave's ROS), ARCOS (advanced robotics control operating system), the robotic development platform ESRP from Evolution Robotics®, MRDS (Microsoft® Robotics Developer Studio), ROSJAVA, and the like. A robot operating system may include publish and subscribe functionality and may also include functionality to control components of the robot, such as head tracking, base movement, actuation of articulating arms, legs, grippers, etc.

The client device 60 may also include components or devices that allow the client device to interact with its environment. For example, the client device 60 may include one or more actuators 74, such as motors, wheels, articulating grippers, movable arms, legs, head, etc., that enable the device to physically move or interact with objects in its environment.

In some examples, various sensors and devices on the client device 60 may be configured as modules. Such modules may be physical components coupled to the client device 60 and/or software or other programming instruction modules that are executed locally or remotely for the client device. Different modules may be added or removed from the client device 60 depending on requirements of the client device. For example, in a low power situation, the device 60 may have fewer modules to reduce power usages. In another example, additional physical sensor or software modules may be added to increase an amount of data the device 60 is able to collect.

In some examples, the client device 60 may be configured to communicate via a wired and/or wireless connection to a computing device, such as a device 76. The device 76 can be considered a module and may include one or more of the processor 62, the storage 64, the sensors 66, the communication interface 68, and I/O components 70. For example, the client device 60 can be a robot that has a number of actuators, for example, a movable base and articulating arms and grippers, and the client device may be configured to receive the device 76, for example, a smartphone or laptop, that is configured to control one or more components of the client device.

In one example, the client device 60 may be a relatively basic device without one or more of the sensors 66, communication interface 68, or I/O components 70. In the present example, the client device 60 can be coupled to the device 76, which can provide one or more of the sensors 66, communication interface 68, I/O components 70, and other components to the client device. The device 76 can be a smartphone, which provides an interactive display to control the client device 60. A smartphone can also provide additional peripheral components and sensing capabilities to the device 60, such as a wired or wireless communication interface to the cloud, processing capabilities, communication capabilities of the phone, an accelerometer, gyroscope, compass, GPS, camera, a touch screen or other input device, proximity sensor, ambient light sensor, etc. Thus, a smartphone may enable the client device 60 to communicate with the cloud 22 and to download or otherwise access routines, applications, program instructions, and other data from the cloud. For example, a laundry folding routine may be stored on the cloud 22 and a user may be able to select such routine using the device 76, such as a smartphone, to download the routine from the cloud onto the device. When the device 76 is placed into or otherwise coupled to the client device 60, the robot can be controlled to perform the downloaded routine.

As described above with respect to FIG. 1, various client devices, such as the client device 60, may connect to the cloud 22 with its network of computing resources. For example, the client device 60 may access data, applications, processing resources, and the like from the cloud 22 and other client devices connected to the cloud. Further, the cloud 22 may access data, applications, processing resources, and the like from client devices connected to the cloud. The data from each client device in communication with the cloud 22 can be complied into a larger data set that can be accessed by other devices connected to the cloud 22.

Illustratively, the client device 60 may include sensors 66 that generally detect characteristics of the environment and actuators 74 that generally provide motor control for the device. Outputs of the sensors 66, such as camera feeds, vision sensors, microphones, etc., may be provided to the cloud 22, which can process the outputs to enable the device 60 to perform functions. The cloud 22 may process a camera feed, for example, to determine a location of a client device, such as a robot, to perform object recognition, and/or to identify or map a navigation pathway for the robot. In some embodiments, the processing can be performed entirely by the cloud 22 or can be divided between a client device and the cloud.

In another example, the client device 60 may take a picture of an object and upload the picture to the cloud 22. An object recognition application on the cloud 22 may be configured to identify the object in the picture and to provide data to other robots connected to the cloud about the object. Such data about the object may include, for example, a location, size, weight, and color of the object.

In yet another example, one or more of the client devices 32-38 of FIG. 1 may be robots that can perform any number of actions with an area, objects, people, other robots, etc. In one example, each robot 32-38 has WiFi or other network based connectivity and can upload or publish data to the cloud 22 that can then be shared with other robots. In this manner, each robot shares experiences with other robots to enable learned behaviors. For example, the robot 32 may traverse a pathway and encounter an obstacle, and can inform the other robots 34-38, through the cloud 22, of the location of the obstacle. Each robot 32-38 can have access to such substantially real-time data. In another example, the robot 32 can download data related to images captured by the other robots 34-38 to help the robot 32 identify the object using various images captured of the object from different perspectives.

In still another example, the robot 34 may build a map of an area and the robot 32 can download the map to obtain information regarding the area. Similarly, the robot 32 can update the map created by the robot 34 with new information about the area, for example, a hallway now has boxes or other obstacles, or with new information collected from sensors that the robot 34 may not have had, for example, the robot 32 may record and add temperature data to the map if the robot 34 did not have a temperature sensor. Overall, the robots 32-38 may be configured to share data that is collected to enable faster adaptation, such that each robot can build upon a learned experience of a previous robot.

Sharing and adaptation capabilities enable a variety of applications based on a variety of inputs/data received from the robots 32-38. In one example, mapping of a physical location can be enabled to provide data regarding a history of where a robot has been. In another example, environmental indicia or indicators may be recorded to facilitate mapping/navigational functionality of the robots 32-38, illustratively, a scuff mark on a wall can be one of many cues that a robot may record and then rely upon later to orient itself.

In one example, the cloud 22 may include, store, or provide access to information related to objects stored in the database 30, for example. The database 30 may be accessible by all the robots 32-38. The database 30 may include information relating to objects, such as mass, properties, and shape, that may be associated with the object. Such information can be accessed by the robots 32-38 to perform object recognition, for example. Further, the information may include instructions for use of an object, for example, for a phone, the instructions may include how to pick up a handset, how to answer the phone, location of buttons, how to dial, etc.

In addition, the database 30 may include information about objects that can be used to distinguish objects. For example, the database 30 may include general information regarding an object, such as a computer, and additionally, information regarding a specific computer, such as a model number, operating system, or other technical specifications of a specific model. Each object may include information in the database 30 including an object name, object details, object distinguishing characteristics, etc. In further examples, the database 30 may include a global unique identifier (GUID) for objects identified in the database to enable distinguishing between specific objects. The GUID may be associated with any characteristics or information describing the object. Thus, a robot may be configured to access the database 30 to receive information generally distinguishing objects, such as a baseball and a computer, and to receive information that may distinguish between specific objects, such as two different computers.

Figure 3:
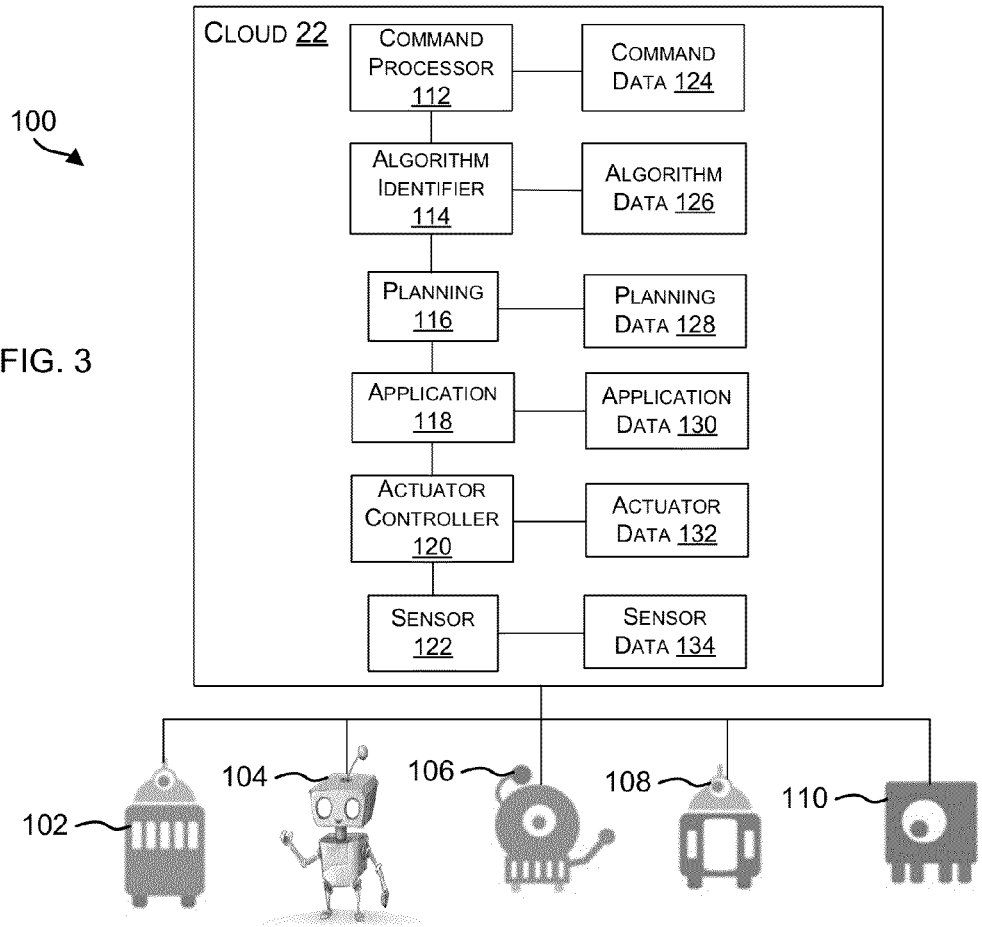
FIG. 3 is a block diagram of a cloud computing system in accordance with one example.

FIG. 3 is an example system 100 in which client devices that are represented as robots 102-110, for example, may interact with a cloud 22 and share information with other computing resources and client devices, such as other robots, configured to communicate with the cloud. In FIG. 3, the cloud includes a plurality of computing resource nodes or modules 112-122 and associated data storage nodes or modules 124-134, respectively.

More particularly, the node 112 in FIG. 3 is a command processor node that is generally configured to process a command or request for a client device, such as the robot 102, to perform a task. Such command or request may be received through the robot 102 or may be received through the cloud 22 and assigned to the robot 102 for execution. In various examples, the command or request can be an audible command spoken by a user, a manually initiated command entered by a user on an input device, and/or a command that is automatically generated based on a schedule or other triggering event. The command processor node 112 is associated with the node 124, which stores command data that may be relevant to processing and interpreting commands. For example, the command data node 124 may include speech recognition data to interpret audible commands and a task schedule for triggering an automatically generated command.

The node 114 of FIG. 3 is an algorithm identifier node that is generally configured to identify instructions and/or processes that can be utilized to perform the task. The algorithm identifier node 114 is associated with the node 126, which stores algorithm data that may be relevant to identifying the algorithm. For example, the algorithm data node 126 may store a list of instructions and processes that can be executed by client devices and previously identified algorithms associated with particular commands.

In the present example, the node 116 is a planning node that is generally configured to plan, schedule, and/or organize the instructions and/or processes of the algorithm to perform the task. The planning node 116 is associated with the node 128, which stores planning data that may assist in the planning, scheduling, and/or organizing.

The node 118 is an application node that is configured to enable a robot to perform any of a number of applications, such as a navigation application, a mapping application, an inventorying application, an object recognition application, an object use and/or manipulation application, etc. The application node 118 is associated with the node 130, which stores application data that can be used to perform the applications.

Further, the node 120 is an actuator controller node that is configured to control various actuators, for example, mechanical, electrical, and/or electromechanical actuators, of a client device. The actuator controller node 120 is associated with the node 132, which stores actuator data that can be utilized to control the actuators. For example, the actuator data may include speed and force control data for actuators of a robot.

The node 122 of FIG. 3 is a sensor node that is configured to control various sensors of a robot to obtain environmental or other data, for example. The sensor node 122 is associated with the node 134, which stores sensor data, such as environmental or other data obtained by the sensors and/or information to configure and obtain environmental or other data using the sensors.

Any of the nodes 112-134 may be interconnected and/or may communicate to receive data or instructions from each other so as to provide a specific output or functionality for the robots 102-110. The nodes 112-134 may be implemented on a variety of devices, including computing resources coupled to the cloud, the robots 102-110 themselves, and other devices in communication with the cloud. Further, the cloud 22 of FIG. 2 may include additional or fewer nodes, as needed or desired. For example, the various nodes 112-134 may be combined into fewer nodes, divided into additional nodes, and/or removed based upon a desired implementation.

Figure 4:
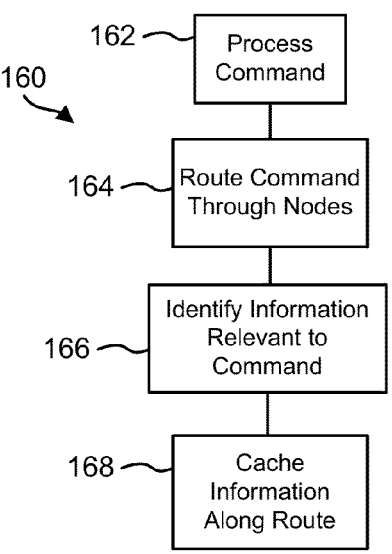
FIG. 4 is a flowchart of a method that can be executed to process a command or request for a client device to perform a task, in accordance with one example.

Referring now to FIG. 4, a flowchart is illustrated of a method 160 that can be executed to process a command or request for a client device to perform a task, in accordance with one example. The method of FIG. 4 can be used with a cloud computing system, such as the systems 20, 100 of FIGS. 1 and 3, respectively, and any of the client devices 32-38, 60, 102-110 of FIGS. 1-3. The method 160 may include one or more operations, functions, or actions as illustrated by one or more of blocks 162-168. Although the blocks 162-168 are illustrated in a sequential order, the blocks may also be performed in parallel, and/or in a different order than described herein. Also, method 160 may include additional or fewer blocks, as needed or desired. For example, the various blocks 162-168 may be combined into fewer blocks, divided into additional blocks, and/or removed based upon a desired implementation.

In addition, each block 162-168 may represent a module, a segment, or a portion of program code, which includes one or more instructions executable by a processor for implementing specific logical functions or steps in the process. The program code may be stored on any type of computer readable medium or storage device including a disk or hard drive, for example. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, one or more of the blocks 162-168 may represent circuitry that is wired to perform the specific logical functions of the method 160.

In the method 160 illustrated in FIG. 4, the block 162 processes a command or request for a client device, such as one or more of the robots 102-110 of FIG. 3, to perform a task. Generally, the block 162 receives and interprets the command, which can be performed with the nodes 112, 124 of FIG. 3, for example. In one example, the task may be an audible command from a user sitting in a living room of the user's home for the robot 104 to retrieve a cold cola drink. In the present example, the block 162 may receive the audible command through a microphone system, which may be incorporated in the robot 104 or perhaps distributed throughout the user's home. The block 162 may then process and interpret the audible command to identify the task of retrieving a cold cola drink.

Next, control passes to the block 164 and the command is routed or processed through one or more nodes of a cloud system to perform the task. Control also passes to the block 166 to identify information relevant to the command. Generally, the blocks 162, 164 define a processing path or slug trail of a command to perform a task and the block 166 identifies relevant information that can be associated with the slug trail for use in processing subsequent requests.

Referring to FIG. 3, for example, the block 164 can route the command through one or more of the nodes 114-122. Illustratively, the command to retrieve a cold cola drink can be routed to the algorithm identifier node 114 to identify general instructions and/or processes to retrieve an object. The block 166 can identify such general instructions, which may be stored in the algorithm data node 126 and may include, for example, instructions to move to an area where the object is located, scan the area to identify the object, control actuators to acquire the object, and move to a delivery location for the object.

In the present example, the block 164 can route commands to the planning node 116 to plan the execution of the instructions to perform the task of retrieving a cold cola drink. The block 166 can access information in the planning data node 128 to facilitate the planning. For example, the planning data node 128 may include data related to the locations of the robot 104, the object, and the delivery area. In the present example, the object is a cold cola drink, which is located in refrigerator in a kitchen and in a refrigerator in a garage of the user's home. The planning data node 128 may include information related to distances between the robot, the refrigerator in the kitchen, the refrigerator in the garage, and the delivery area to facilitate the planning of instructions to retrieve a cold cola drink. The data in the planning data node 128 may also include first and second physical pathways that the robot 104 can travel from its current location to the object and then to the delivery area.

The block 164 can also route the command to the application node 118 of FIG. 3. Generally, the application node 118 provides access to applications that can be used by the robot 104 to perform the task, for example, a navigation application, an object recognition application, and an object manipulation application. Further, the block 166 can identify application data stored in the node 130 to enable the robot 104 to perform the task, for example, data to identify and manipulate a cold cola drink.

Further, the block 164 can route the command to the actuator controller node 120 and the sensor node 122. The actuator controller node 120 can be accessed to control actuators of the robot 104 to traverse a pathway, such as the first pathway discussed above with respect to the planning nodes 116, 128, and to manipulate actuators of the robot to open a refrigerator and retrieve the cola drink. The block 166 can identify actuator data stored in the node 132 that can generally be utilized to control the actuators. Further, in the present example, the block 164 can route the command to the sensor node 122 to control a temperature sensor on the robot 104 to obtain data regarding the temperature of a cola drink in the refrigerator. The block 166 can identify and store such temperature data in the sensor data node 134. In one example, the temperature data from the sensor can be compared to other sensor data in the node 134 to determine whether the cola drink is cold.

In the present example, the block 166 has been described as identifying information stored in a particular data node 124-134 generally concurrently with routing the command to an associated node 112-122. Typically, such information in the data nodes 124-134 is relevant to the associated nodes 112-122. However, such information may also be relevant to other nodes and perhaps useful if identified earlier in the routing of the command through the nodes.

In FIG. 4, the block 168 temporarily or permanently caches, associates, or stores such relevant information with one or more nodes through which the command is routed or processed. The relevant information can be time-stamped and/or cached for a predetermined period so that recent information that is most relevant can be identified and used to process subsequent requests or commands. The information cached by the block 168 can be shared with other robots and client devices coupled to the cloud and can be particularly useful when later commands are being processed and routed in accordance with the method 160 of FIG. 4, for example. Such later commands can then encounter relevant information sooner in the command processing route or slug trail. Generally, during the block 168, information that is normally associated with downstream nodes can be cached with upstream nodes so that such information can be taken into account earlier in the processing of a subsequent command. In particular, the subsequent command can be a command to perform a similar task or merely a command that shares a similar processing route or slug trail. Such information can also be shared with other robots and client devices that can communicate with the cloud to facilitate the processing and execution of subsequent commands.

In one example, the block 166 can identify information that is obtained through interactions that a robot experiences. Such interactions may occur, for example, as the robot is performing the task within an environment. Consequently, during the blocks 164 and 166, the robot 104 or other client device can be controlled to perform one or more processes to execute the task and such processes may involve interactions that generate new information that is relevant to the task. The block 168 can cache such new information with one or more nodes through which the command is routed and processed. In the present example, during the block 164, the robot 104 or other client device may also be controlled to automatically download new information relevant to the task. The automatic download of new information can be triggered, for example, by specific locations. Illustratively, when a robot enters a new room, information regarding the room may be retrieved, wherein such information may have been previously collected by another robot or client device and/or determined by the cloud based on data previously collected by another robot or client device.

In another example, the block 166 identifies environmental information related to a location where the task is to be performed. The environmental information may be stored in the sensor data node 134, such as information that the cola drinks in the garage refrigerator are not cold. In this example, the block 168 can cache such information at the planning data node 128. The information that the cola drinks in the garage refrigerator are not cold can be time-stamped or cached temporarily. When another command is issued within a given time period to retrieve a cold cola drink and the command is routed to the planning node 116 and the planning data node 128, the planning node 116 can take into account the information and plan to instruct a robot to retrieve a cola drink from the kitchen refrigerator.

In a further example, the sensor data node 134 may include environmental information that a particular pathway is blocked by an obstruction. Similarly, the block 168 can cache such information at the planning data node 128 so that subsequent commands will encounter the information and can plan accordingly.

In yet another example, information related to a particular task may include restrictions on certain users from requesting a robot to perform the task. For example, the information may be that an underage user cannot request the retrieval of an alcoholic beverage. In this example, the block 168 can cache the restriction information at the command data block 124 where the restriction is identified along with the processing and interpretation of the command.

Figure 5:
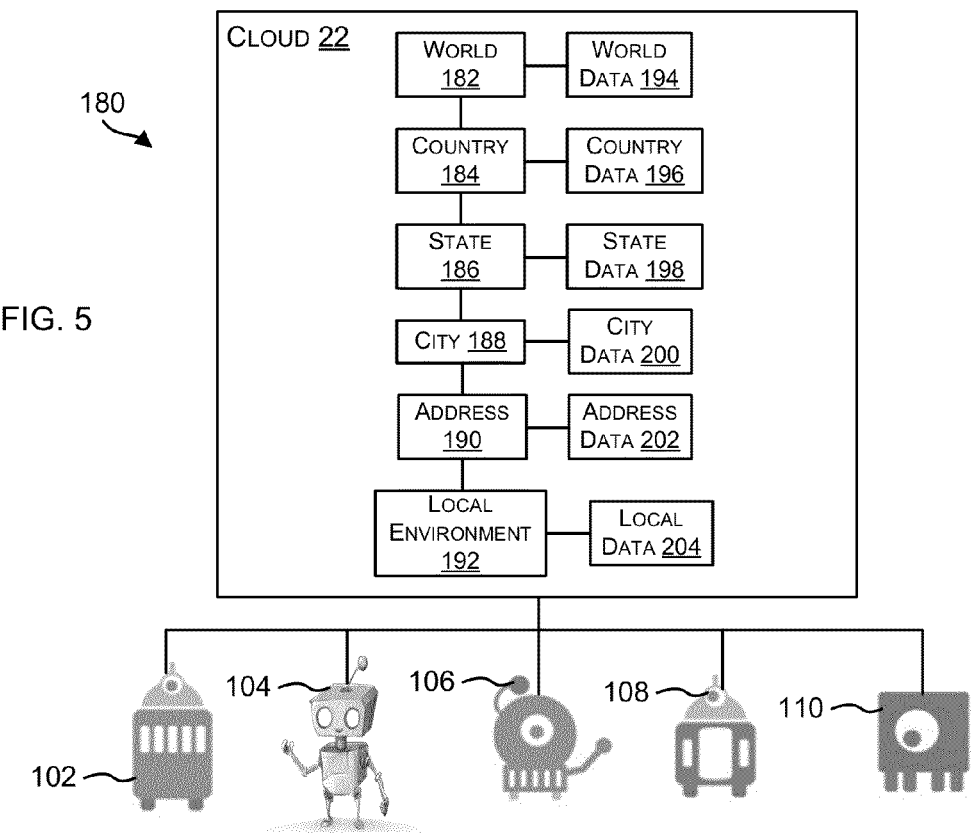
FIG. 5 is a block diagram of a cloud computing system in accordance with one example.

FIG. 5 illustrates an example system 180 that is similar to the system 160 of FIG. 3, in which client devices that are represented as robots 102-110, for example, may interact with a cloud 22 and share information with other computing resources and client devices, such as other robots, in communication with the cloud. The system 180 of FIG. 5 illustrates another example of various computing resource nodes 182-192 and associated data storage nodes 194-204, respectively. In FIG. 5, the nodes 182-192 represent computing resources that are arranged in a generally hierarchical configuration, wherein high-level instructions and data are provided at higher-level nodes and more location-specific instructions and data are provided at lower-level nodes.

For example, the computing resource nodes 182-192 are generally identified as world, country, state, city, address, and local environment, respectively. Similarly, the data storage nodes 194-204 store data relevant to world, country, state, city, address, and local environment nodes 182-192, respectively. Generally, the high-level world node 182 and the world data node 194 provide instructions and data relevant to all robots and client devices configured to communicate with the cloud, the country node 184 and the country data node 196 provide instructions and data relevant to robots and client devices configured to communicate with the cloud within a particular country, and the state node 186 and the state data node 198 provide instructions and data relevant to robots and client devices configured to communicate with the cloud within a particular state. Similarly, generally, the city node 188 and the city data node 200 provide instructions and data relevant to robots and client devices configured to communicate with the cloud within a particular city, the address node 190 and the address data node 202 provide instructions and data relevant to robots and client devices configured to communicate with the cloud within a particular address, and the low-level local environment node 192 and the local environment data node 204 provide instructions and data relevant to robots and client devices configured to communicate with the cloud within a particular local environment, such as a particular room in a house or a particular unit in an office building. Other hierarchical arrangements of processing and corresponding data nodes could be implemented as well.

In the present example, the nodes 112-122 of FIG. 3 can be implemented through the computing resource nodes 182-192. Generally, each of the computing resources nodes 182-192 can implement one or more of the nodes 112-122 to control a client device, such as the robots 102-110, to perform a task.

Further, the method 160 of FIG. 4 can be used with the system 180 of FIG. 5 to process a command or request for a client device to perform a task. In the example above of an audible command for a robot to retrieve a cold cola drink, the block 162 of FIG. 4 receives and interprets the command. In the present example, the robot 104 may receive the audible command and the block 164 may route the command through local computing resources, such as through the local environment node 192 or the address node 190 of FIG. 5. The local environment node 192 and the address node 190 in the present example can be implemented as a server or computer at the user's home that is coupled to the cloud 22 and configured to control one or more devices within the home.

In this example, the nodes 190, 192 may not have the necessary instructions to interpret the audible command. Consequently, the block 164 routes the command a higher-level node, such as the world or country nodes 182, 184 to process and interpret the command. The block 166 may identify the instructions to interpret the command in a higher-level data node, such as the world or country data nodes 194, 196. After the command is interpreted, the block 164 can route the command through other higher-level nodes, such as the state or city nodes 182, 184 for further processing. For example, the state node 186 may implement the algorithm identifier node 114 and the city node 188 may implement the planning node 116 and the application node 118. Along the way, the block 166 may identify relevant information and instructions in the data nodes 198-202, for example. Thereafter, the block 164 can route the command back to the address and/or local environment nodes 190, 192 to implement the actuator controller and sensor nodes 120, 122 and to control the robot 104 to perform the task of retrieving a cold cola drink. The block 166 may identify further information and instructions associated with any of the nodes 120, 122, 190, 192.

The information identified by the block 166 as the command is routed through the various nodes of FIGS. 3 and 5 can be cached, associated, or stored by the block 168 along the route through which the command is routed. Referring more particularly to FIG. 5, during the block 168, information that is associated with a higher-level node can be cached with a lower-level or local node so that such information can be taken into account earlier in the processing of a subsequent command.

In one non-limiting example, the block 168 can cache information related to the world node 182 and the world data node 194 at a lower-level node, such as the address nodes 190, 202 and/or the local environment nodes 192, 204. Such information may include, for example, instructions for interpreting an audible command. Likewise, information related to identifying algorithms, planning, applications, actuator controllers, and sensors, which may be associated with higher-level nodes can be associated with or cached at lower-level nodes, such that the processing of subsequent commands can be performed more locally to the execution of the task.

Any of the nodes 182-204 may be interconnected and/or may communicate to receive data or instructions from each other so as to provide a specific output or functionality for the robots 102-110. The nodes 182-204 may be implemented on a variety of devices, including computing resources coupled to the cloud, the robots 102-110 themselves, and other devices in communication with the cloud. Further, the cloud 22 may include additional or fewer nodes, as needed or desired and the various nodes 182-204 may be combined into fewer nodes, divided into additional nodes, and/or removed based upon a desired implementation.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   receiving a first request for a first robot to perform a task at a location, wherein the first robot includes a mechanical actuator and at least one sensor;
   processing the first request along a processing route through a first node and a subsequent second node of a plurality of nodes of a cloud computing system to identify environmental information related to the location where the task is to be performed from the second node of the plurality of nodes, wherein the second node is assigned to store the environmental information;
   selecting a given node upstream from the second node along the processing route, wherein the given node includes the first node;
   associating the environmental information with the first node of the plurality of nodes;
   associating the first node with the processing route so that the environmental information can be accessed earlier in the processing route for a subsequent command to perform a subsequent task at the location;
   receiving a second request for a second robot to perform a given task at the location; and
   processing the second request along the processing route through the plurality of nodes of the cloud computing system to identify the environmental information related to the location where the given task is to be performed from the first node of the plurality of nodes.

2. The method of claim 1, wherein associating the environmental information with the first node of the plurality of nodes comprises temporarily caching the environmental information at the first node for a predetermined time period.

3. The method of claim 1, further comprising providing first instructions to the first robot for performing the task at the location based on the identified environmental information.

4. The method of claim 1, further comprising associating a time for which the processing route is active to so as provide current environmental information related to the location.

5. The method of claim 1, further comprising modifying the processing route to be indicative of a route followed by the first request and a first matching response found for the first request.

6. The method of claim 1, further comprising:
   determining whether the processing route is active due to non-expiration of a time period associated with the environmental information; and
   in response to determining that the processing route is active, processing the second request along the processing route through the plurality of nodes of the cloud computing system to identify the environmental information related to the location where the given task is to be performed from the first node of the plurality of nodes.

7. The method of claim 1, further comprising:
   receiving data associated with the location collected by the at least one sensor of the first robot while performing the task at the location; and
   revising the processing route to reflect at least some of the data collected by the first robot.

8. The method of claim 7, further comprising providing instructions to the second robot for performing the given task at the location, wherein the instructions are based at least in part on the data associated with the location collected by the at least one sensor of the first robot while performing the task at the location.

9. A non-transitory computer readable medium having stored therein instructions, that when executed by a computing device, cause the computing device to perform functions comprising:
   receiving a first request for a first robot to perform a task at a location, wherein the first robot includes a mechanical actuator and at least one sensor;
   processing the first request along a processing route through a first node and a subsequent second node of a plurality of nodes of a cloud computing system to identify environmental information related to the location where the task is to be performed from the second node of the plurality of nodes, wherein the second node is assigned to store the environmental information;
   selecting a given node upstream from the second node along the processing route, wherein the given node includes the first node;
   associating the environmental information with the first node of the plurality of nodes;
   associating the first node with the processing route so that the environmental information can be accessed earlier in the processing route for a subsequent command to perform a subsequent task at the location;
   receiving a second request for a second robot to perform a given task at the location; and
   processing the second request along the processing route through the plurality of nodes of the cloud computing system to identify the environmental information related to the location where the given task is to be performed from the first node of the plurality of nodes.

10. The non-transitory computer readable medium of claim 9, wherein the functions further comprise associating a time for which the processing route is active so as to provide current environmental information related to the location.

11. The non-transitory computer readable medium of claim 9, wherein the functions further comprise modifying the processing route to be indicative of a route followed by the first request and a first matching response found for the first request.

12. The non-transitory computer readable medium of claim 9, wherein the functions further comprise:
   determining whether the processing route is active due to non-expiration of a time period associated with the environmental information; and
   in response to determining that the processing route is active, processing the second request along the processing route through the plurality of nodes of the cloud computing system to identify the environmental information related to the location where the given task is to be performed from the first node of the plurality of nodes.

13. The non-transitory computer readable medium of claim 9, wherein the functions further comprise:
   receiving data associated with the location collected by the at least one sensor of the first robot while performing the task at the location; and
   revising the processing route to reflect at least some of the data collected by the first robot.

14. The non-transitory computer readable medium of claim 13, wherein the functions further comprise providing instructions to the second robot for performing the given task at the location, wherein the instructions are based at least in part on the data associated with the location collected by the at least one sensor of the first robot while performing the task at the location.

15. A system comprising:
   a processor; and memory configured to stored instructions that when executed by the processor, cause the system to perform functions comprising:
- receiving a first request for a first robot to perform a task at a location, wherein the first robot includes a mechanical actuator and at least one sensor;
- processing the first request along a processing route through a first node and a subsequent second node of a plurality of nodes of a cloud computing system to identify environmental information related to the location where the task is to be performed from the second node of the plurality of nodes, wherein the second node is assigned to store the environmental information;
- selecting a given node upstream from the second node along the processing route, wherein the given node includes the first node;
- associating the environmental information with the first node of the plurality of nodes;
- associating the first node with the processing route so that the environmental information can be accessed earlier in the processing route for a subsequent command to perform a subsequent task at the location;
- receiving a second request for a second robot to perform a given task at the location; and
- processing the second request along the processing route through the plurality of nodes of the cloud computing system to identify the environmental information related to the location where the given task is to be performed from the first node of the plurality of nodes.

16. The system of claim 15, wherein the functions further comprise:
- determining whether the processing route is active due to non-expiration of a time period associated with the environmental information; and
- in response to determining that the processing route is active, processing the second request along the processing route through the plurality of nodes of the cloud computing system to identify the environmental information related to the location where the given task is to be performed from the first node of the plurality of nodes.

17. The system of claim 15, wherein the functions further comprise:
- receiving data associated with the location collected by the at least one sensor of the first robot while performing the task at the location;
- revising the processing route to reflect at least some of the data collected by the first robot; and
- providing instructions to the second robot for performing the given task at the location, wherein the instructions are based at least in part on the data associated with the location collected by the at least one sensor of the first robot while performing the task at the location.

* * * * *